United States Patent [19]

Hass

[11] 4,324,585

[45] Apr. 13, 1982

[54] PROCESS FOR MANUFACTURE OF ALUMINUM

[76] Inventor: Henry B. Hass, 95 Fernwood Rd., Summit, N.J. 07901

[21] Appl. No.: 155,687

[22] Filed: Jun. 2, 1980

[51] Int. Cl.³ .............................................. C22B 21/02
[52] U.S. Cl. .................................................... 75/68 B
[58] Field of Search ........................................ 75/68 B

[56] References Cited

U.S. PATENT DOCUMENTS 3,832,164  8/1974  Kapolyi et al. ....................... 75/68 B
3,938,988  2/1976  Othmer ................................. 75/68 B

*Primary Examiner*—M. J. Andrews
*Attorney, Agent, or Firm*—E. Janet Berry

[57] ABSTRACT

The invention is a multistep process for the production of metallic aluminum. An aluminum containing ore such as bauxite, alumina, and clay is reacted with a carbon containing material, oxygen and bromine at an elevated temperature to produce aluminum bromide. The aluminum bromide is then electrolyzed to give aluminum and bromine. The bromine is conveniently recycled to the first step. The oxides and other reactive contaminants in the ore starting materials are simultaneously converted to bromides which can be hydrolyzed and oxidized to bromine for use in the process. Alternative steps in the process are also possible which avoid the electrolysis step but use a disproportionation step.

2 Claims, No Drawings

PROCESS FOR MANUFACTURE OF ALUMINUM

This invention is generally concerned with a process for making metallic aluminum by an improved electrolytic process. More particularly, the process is a multistep method for making aluminum metal from commonly occurring aluminum-containing ores, such as bauxite, alumina and clays. In a first step the aluminum in the aluminum-containing component is converted to aluminum bromide (AlBr$_3$) by reacting the ore with bromine in the presence of gaseous oxygen and carbon. The aluminum bromide so obtained is then suitably reacted or treated to convert it into aluminum and bromine. The aluminum metal is recovered as product and the bromine so produced is recycled to the first step of the process.

In the past, aluminum metal has been made commercially by a variety of methods. The best known and most widely used process is the high temperature electrolysis of alumina dissolved in molten cryolite. Unfortunately, this process has a very substantial disadvantage in that the efficiency of the electrolysis is only about 30-35% of theoretical. More recently, more advanced technology has been developed whereby anhydrous aluminum chloride is electrolyzed. This newer process has been found to save substantial energy.

Aluminum is the most abundant metal found in the earth's crust. It has many advantages as it is relatively strong for its light weight and forms a fine protective coating of white aluminum oxide in air. It finds use in kitchen utensils and other such household items such as window frames, shower stalls, airplane frames and general construction, boats, automotive and truck construction, building siding and increasingly in all areas where its light weight and other good characteristics are advantageous.

Thin aluminum foil is widely used in the printing and glass industries and also for wrapping purposes and many decorative and for ornamental effects.

In the more recently used process wherein aluminum chloride is electrolyzed, the bauxite, carbon, chlorine and oxygen undergoes reaction in the blast furnace according to the following reaction:

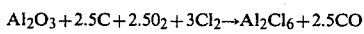

$$Al_2O_3 + 2.5C + 2.5O_2 + 3Cl_2 \rightarrow Al_2Cl_6 + 2.5CO$$

It has now been discovered that bromine can be used very advantageously in place of chlorine. If the starting material for the electrolysis step is aluminum bromide rather than aluminum chloride there is a saving of at least 20% and up to 30% in electrical energy necessary to produce the aluminum metal. In the past, the use of bromine has been considered to be uneconomical for commercial operations such as for aluminum production, as its cost was much greater as compared to that of chlorine. However, recent discoveries of bromine-containing brines in the United States as well as more efficient utilization of Dead Sea brine has minimized this cost differential. Also in carrying out the cyclic process, using bromine, the bromine losses can be minimized by more efficient procedures.

An additional advantage of the use of bromine instead of chlorine is based on the fact that the various bauxites used as source materials for the aluminum contain oxides of other metals as impurities. The principal impurities which occur are the oxides of iron and silicon. Under the conditions used in the blast furnace step these oxides are converted to the corresponding bromides. After suitable condensation, these bromides can be separated by rectification in a column of appropriate design.

It has been found that anhydrous aluminum bromide does not conduct electricity well when it is used in its pure form. In order to overcome this deficiency for its use in the electrolysis step, it has been found advantageous to add to the aluminum bromide a small amount from 0.10% to 10.0% based on the aluminum bromide of a bromide or chloride of one or more of the elements which are more electropositive than aluminum in the electromotive series of elements. Chlorides and bromides of such elements as lithium, sodium, potassium, magnesium, calcium, strontium, and barium are convenient examples of compounds which can be used for this purpose, although in some instances, relative high cost might be a consideration. Magnesium is of especial value since in many instances, magnesium is added to aluminum for commercial purposes to improve its performance and change its characteristics.

In locations where electrical energy is scarce or expensive the electrolysis step can be avoided by a partial decomposition of AlBr$_3$ into AlBr and Br$_2$. After separation, the AlBr is disproportionated to Al + AlBr$_3$. The latter is recycled. As an additional feature, the blast furnace can be operated to produce aluminum monobromide directly as the major product. On cooling, this disproportionates and the aluminum tribromide is recycled. In this process aluminum can also be produced by reducing aluminum bromide with a fused electrolyte which is about 50% NaBr, about 45% LiBr, and about 5% AlBr$_3$ at 700° C.

In the next step after the blast furnace conversion of the oxides to bromides followed by rectification of the bromides, the bromides of iron and silicon, resulting from the bauxite reaction can be readily hydrolysed by steam. The resulting hydrogen bromide product is then preferably oxidized by a modification of the so-called Kel-Chlor process.

As an alternative method for obtaining aluminum, it is also possible to operate the blast furnace at a sufficiently high temperature such that the bromide product issuing therefrom is predominantly or even exclusively, AlBr. When this compound is subjected to cooling, it disproportionates into aluminum and aluminum tribromide. The aluminum tribromide can be recycled through the blast furnace or it can be subjected to electrolysis and the bromine thus obtained can then be recycled through the blast furnace.

A further advantage of the process to obtain aluminum metal is that the metal is obtained in very high (over 99.9%) purity, the exact level of purity being dependent on the efficiency of the rectification separation of the bromides. Thus, there is no necessity for further purification of the aluminum as it is obtained.

For example, in carrying out the blast furnace reaction for the preparation of the aluminum bromide, alumina or alumina-containing particles of approximately 100 mesh average particle size are fed into a reactor vessel together with carbon, oxygen and bromine. The process may be carried out batchwise or it may be carried out on a continuous basis, for instance in a fluidized bed operation. The carbon may if desired be provided by a pre-coking step for the alumina particles by heating carbonaceous material with the alumina. The reaction between the alumina, the bromine vapor in the presence of oxygen is exothermic and a bromination temperature of above 500° C. up to about 550° C. to 600° C. The gaseous effluent is passed to a heat exchanger and cooled to 200°–250° C. This gaseous effluent will contain gaseous aluminum bromide, bromine, carbon monoxide and carbon dioxide together with entrained carbon dust and coked alumina and any other residual impurities present in the starting materials.

Solid entrained particles are filtered out and the aluminum bromide recovered. It may be purified and treated in any of the known methods as required.

The bromides including the aluminum bromides are then rectified by means of a suitable rectifying column. There may be some difficulties with corrosion but this can be avoided by use of a pyrex glass column.

The aluminum bromide is then electrolyzed to yield metallic aluminum and bromine which is then recycled to the first step of the process.

The conversion of the bromides of iron and silicon and other bromides present can be carried out by contact with steam at suitable temperatures to hydrolyze them, thereby giving hydrogen bromide as one of the recovered products. In connection with the recovery of the bromine from hydrogen bromide for recycling to the process, this can be done by hydrolysis and oxidation steps to recover the bromine. Thus, any hydrogen bromide which is obtained as a byproduct in the process is conveniently treated by a modification of the so-called and well-known Kel-Chlor process in which nitrosyl sulfuric acid in dilute sulfuric acid is treated with a stream of hydrogen chloride, and oxygen in a stripping tower.

Operating thus but using hydrogen bromide instead of hydrogen chloride there is produced a gaseous mixture of hydrogen bromide, oxygen and nitrosyl bromide. This mixture is first passed to an oxidization stage and in the first stage the temperature is raised to produce a dissociation reaction in which the nitrosyl bromide is dissociated and the oxygen present reacts with the nitric oxide to form nitrogen dioxide.

Thus, the final products of this reaction are bromine and nitrogen dioxide. The gases from this first stage are then passed to a second stage in which these products are contacted with sulfuric acid and liquids from the stripping tower to produce the reverse reaction of that occurring in the stripper. Thus, there is produced nitrosyl sulfuric acid and hydrogen bromide. The hydrogen bromide formed is oxidized to bromine. In an adsorption zone, the bromine is recovered. It may contain small amounts of hydrogen bromide and nitrogen compounds. The nitrogenous compounds from the process are recovered and recycled.

The bromine, except for trace losses is also thus essentially totally recovered and recycled to the initial reaction to produce aluminum bromide the electrolysis.

The invention will be described in greater detail by the following Example although it is not intended to limit the invention specifically thereto.

EXAMPLE

Alumina as alumina-containing particles of average particle size of about 100 mesh are fed into a reactor together with carbon-containing particles, oxygen and bromine. These reactants are fed continuously and preferably into a heated fluidized bed reactor. This mixture reacts at elevated temperature to produce $AlBr_3$. The $AlBr_3$ thus produced may be electrolyzed under known conditions of electrolysis to yield aluminum metal and bromine which is then recycled.

Alternatively, the $AlBr_3$ can be subjected to temperatures of about 850° C. and above in a suitable blast furnace step whereby $AlBr$ and $Br_2$ are formed. Following cooling, the $AlBr$ disproportionates into $AlBr_3$ and aluminum metal which is recovered. The $AlBr_3$ can either be electrolyzed or recycled to the blast furnace step.

What is claimed is:

1. A process for obtaining aluminum metal comprising the steps of (1) reacting an aluminum containing ore selected from the group consisting of bauxite, alumina, and clay with a carbon containing material, gaseous oxygen, and bromine in a blast furnace at elevated temperatures to obtain aluminum tribromide, (2) thermally decomposing aluminum tribromide to aluminum monobromide and bromine in a blast furnace, (3) separating the aluminum monobromide and thereafter (4) disproportionating the aluminum monobromide to form aluminum and aluminum tribromide.

2. A process for obtaining aluminum metal comprising the steps of reacting an aluminum-containing ore with a carbon-containing material, gaseous oxygen, and bromine in a blast furnace at elevated temperatures to obtain $AlBr_3$, heating the $AlBr_3$ at temperatures of at least 850° C. to obtain $AlBr$ and $Br_2$ in a blast furnace, subjecting the $AlBr$ to cooling to obtain $AlBr_3$ and $Al$, recycling the $AlBr_3$ to the said heating step, recycling the $Br_2$ to the blast furnace step, and recovering the $Al$.

* * * * *